United States Patent [19]

Genestie

[11] Patent Number: 4,583,695
[45] Date of Patent: Apr. 22, 1986

[54] PROCESS FOR PURIFYING RECOVERY GLASS

[75] Inventor: Paul Genestie, Nanterre, France

[73] Assignee: Saint-Gobain Emballage, Courbevoie, France

[21] Appl. No.: 635,024

[22] Filed: Jul. 27, 1984

Related U.S. Application Data

[63] Continuation of Ser. No. 343,239, Jan. 27, 1982, abandoned.

[30] Foreign Application Priority Data

Jan. 28, 1981 [FR] France .................... 81 01563

[51] Int. Cl.⁴ .................................... B02C 23/08
[52] U.S. Cl. ...................................... 241/24; 241/25; 241/30; 241/DIG. 38
[58] Field of Search ............. 209/2, 10, 315; 241/14, 241/24, 25, 29, 30, 81, DIG. 38

[56] References Cited

U.S. PATENT DOCUMENTS

| | | |
|---|---|---|
| 2,526,519 | 10/1950 | Vogel-Jorgensen . |
| 3,337,139 | 8/1967 | Lloyd et al. . |
| 3,384,310 | 5/1968 | Van Slyke et al. . |
| 3,622,089 | 11/1971 | Quinn ............................ 209/315 X |
| 3,650,396 | 3/1972 | Gillespie et al. . |
| 3,905,556 | 9/1975 | Drage . |
| 4,044,956 | 8/1977 | Benedetto et al. ..... 241/DIG. 38 X |
| 4,065,282 | 12/1977 | Morey . |
| 4,067,502 | 1/1978 | Morey et al. . |
| 4,070,273 | 1/1978 | Morey . |
| 4,187,775 | 2/1980 | Flender .................. 241/DIG. 38 X |

FOREIGN PATENT DOCUMENTS

| | | |
|---|---|---|
| 2638608 | 8/1976 | Fed. Rep. of Germany . |
| 2149493 | 8/1972 | France . |
| 2320783 | 8/1976 | France . |

Primary Examiner—Howard N. Goldberg
Assistant Examiner—Timothy V. Eley
Attorney, Agent, or Firm—Pennie & Edmonds

[57] ABSTRACT

This invention discloses a process and apparatus for purifying recovery glass for recycling and reuse. The necessity for manual sorting techniques is minimized due to the invention's unique process of mechanical purification, in parallel, carried out on separate granulometric portions of the recovery glass.

9 Claims, 2 Drawing Figures

PROCESS FOR PURIFYING RECOVERY GLASS

CROSS REFERENCE TO RELATED APPLICATIONS

This application is a continuation of application Ser. No. 343,239, filed Jan. 27, 1982, and now abandoned.

TECHNICAL FIELD

This invention relates to a process and apparatus for purifying recovery glass for recycling and reuse in the manufacture of hollow glass. Advantageously, the process permits the minimization of manual sorting by the use of a technique of mechanical purification carried out, in parallel, on separate granulometric portions of the recovery glass.

BACKGROUND OF THE INVENTION

The reuse of waste products is an important concern of many industries. In the hollow glass industry, the introduction of recovery cullet produced by the collection and grinding of bottles and other glass containers into molten glass charges for recycling represents a particularly desirable goal.

Recycling operations, however, often present the risk of compromising manufacturing quality. In the glass industry, the fact that recovery glass does not have a uniform composition does not limit the proportion of cullet that can be incorporated into the molten glass charges. A major problem posed by the reuse of glass waste products containing a considerable proportion of foreign material, such as stones or infusible pieces of pottery, which is present due to collection processes and successive handling, is the possibility that an unacceptable percentage of foreign material will carry over into the new glass products and create deficiencies in the products of which they will ultimately become a component. To avoid this problem, the standard solution is to sort through the glass waste before reusing it.

A further constraint on the process of purifying recovery glass is an economic one. It is not feasible to recover glass by sorting through household trash from normal collections, and glassmakers can only set up exclusive collection routes in exceptional cases.

In order to secure sufficient tonnage for recovery, it is therefore necessary to arrange for special collection by the usual collection services for storage and, ultimately, routine delivery to the glassworks. Glass collected in this way, due to extensive handling and uncertain cleanliness conditions, contains many broken articles consisting of variable-sized fragments intermixed with light scrap materials such as packing trash, labels, papers, plastic cups, non-ferrous metal elements, lead, tin, and aluminum, or other impurities introduced during the intermediate storage stage, such as pieces or fragments of non-ferrous metals, stones or larger objects of various types. Even when direct collection processes are carried out under optimal conditions of cleanliness, the existence of various packaging elements for the original glass products makes it impossible to completely eliminate the presence of foreign materials in the collected used-products.

Due to the presence of these impurities, the recovered raw glass materials must be purified. The most effective method of purification used to date has been the technique of manual sorting. This process has many drawbacks, including unpredictable results due to operator error and high costs due to the necessity of a series of successive treatments—whose yield of unwanted elements remains fairly constant while absolute effectiveness diminishes with each treatment—to attain a product having a somewhat acceptable level of impurities.

DISCLOSURE OF THE INVENTION

This invention discloses a process and apparatus for purifying recovery glasses for recycling and reuse. Objectives of the invention include the minimization of manual sorting of waste glasses and the improvement of yields of purified products resulting from manual sorting operations.

According to one aspect of the invention, mechanical-purification-in-parallel process steps include the following:

(a) separating the raw glass waste materials into several granulometric portions,
(b) replacing manual sorting by performing selective grinding on each portion—making possible—
(c) separation, by screening of useful recoverable fractions having a low content of impurities from fractions to be rejected because they contain high proportions of refuse and no more than insignificant amounts of glass.

This process permits the progressive elimination of all types of impurities, such as stones and infusible materials, and the incorporation of a large percentage of recovery cullet—up to about 50% and more—into the glass melt.

According to a second aspect of the invention, at least four granulometric portions of the raw charge are advantageously separated:

T1: fines, which require a special treatment
T2: a lower middle portion
T3: an upper middle portion
T4: easily recoverable large fragments.

After optional manual sorting, the middle portions undergo selective grinding, followed by screening into three fractions:

a usable lower fraction
an upper fraction, to be rejected
a middle fraction, to undergo further treatment.

Advantageously, the middle fraction of the upper portion is remixed with the lower middle portion before the latter is treated.

This invention also discloses an apparatus for use of the above-described processes. The apparatus essentially comprises a grinder in combination with a two-stage screen.

The selectivity of the screening step and the choice of limits of the sorting fractions are directly linked, as will later be shown, to the grinding conditions and, essentially, to the speed of the grinders, as well as to the residence time of the material in the grinders—the grinder output.

DESCRIPTION OF THE PREFERRED EMBODIMENTS

Figure 1:
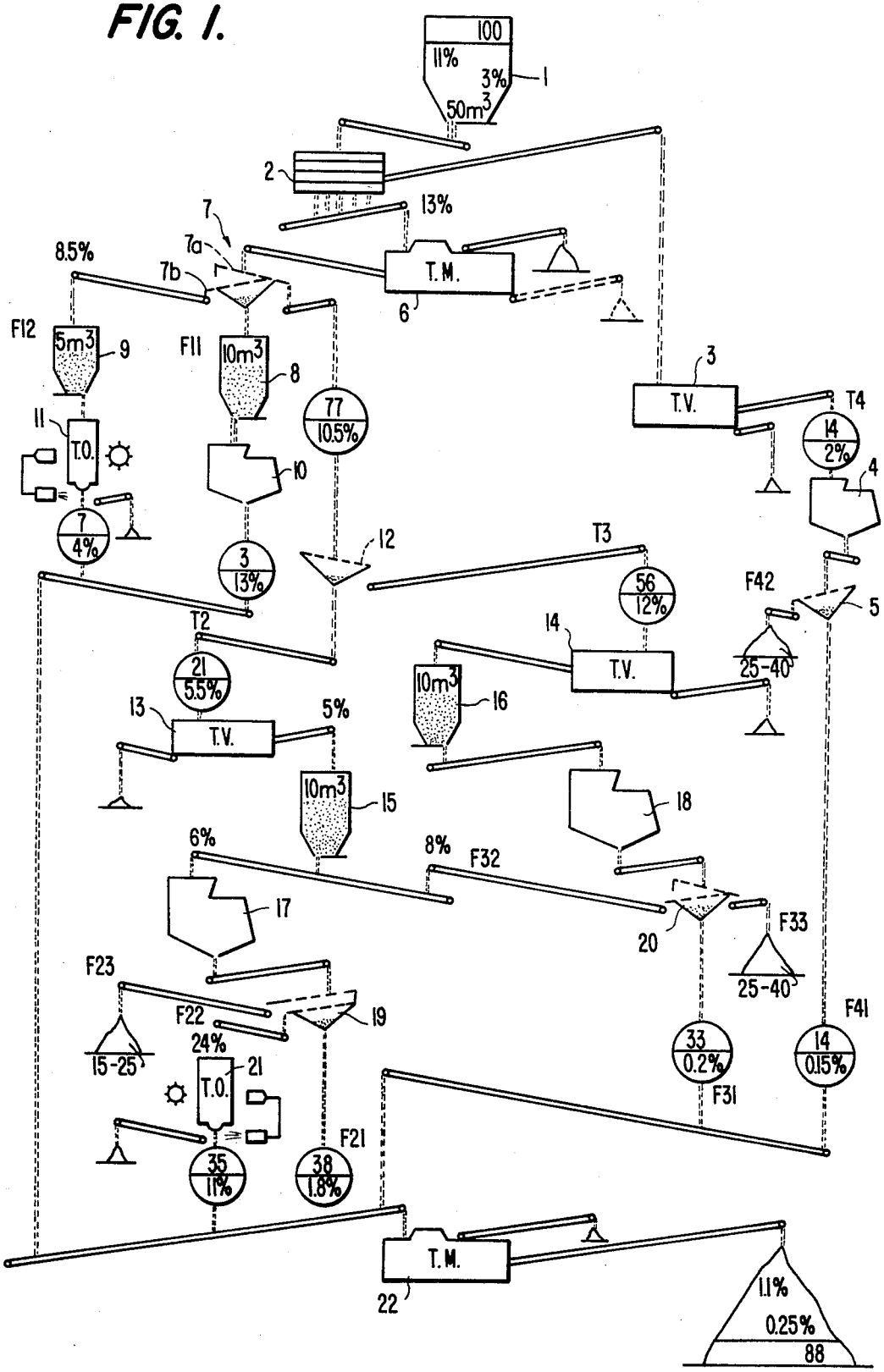
FIG. 1 represents a schematic view of a grinding and selective sorting installation according to the invention, with approximate distribution of tonnages expressed in percent and the relative content of impurities expressed per thousand.

Referring to FIG. 1, the apparatus which is illustrated is designed to purify recovery glass for recycling and reuse.

Raw waste material or charge, introduced by hopper 1, undergoes an initial screening to separate out whole bottles or other articles and large-sized pieces. This separation is advantageously carried out by a screen which comprises a grizzly 2, having diverging bars, which is impenetrable to elements having a minimum size above about 40 mm.

The large pieces caught by grizzly 2 typically represent, at most, about 15% of the treated tonnage. Impurities are readily identified by visual inspection and may be eliminated at manual sorting station 3. Selective grinding, carried out in grinder 4, is followed by screening into the following two fractions at screen 5:

F41, from 0 to 25 mm, usable
F42, from 25 to 40 mm, to be rejected.

Grinding is advantageously performed by a crusher or, more precisely, a jawed granulator and screening is effected by a vibrating screen.

The balance of the raw material travels over a magnetic belt 6 where ferrous products are almost completely eliminated. The material is then sent to a screen 7 which comprises a sieve 7a, having a mesh size of approximately 10 mm and a sieve 7b, having a mesh size of about 5 mm.

Fines T1, which measure less than 10 mm, and therefore go through sieve 7a, represent a little less than about 10% of the tonnage and have a glass content which is at least equal to that of the initial raw material. The fines are separated by sieve 7b into two separate fractions:

F11, from 0 to 5 mm
F12, from 5 to 10 mm.

Both fractions are easily recoverable and are stored in hoppers 8 and 9 for periodic treatment.

Fraction F11, which comprises a little less than 3% of the collected products is made usable by reduction to fines of less than about 2 mm in grinder 10.

Fraction F12 represents approximately 7% of the collected products. The homogeneity of the fraction F12 particles and the relatively small amount of them to be treated permit visual sorting at sorting station 11 by means of an automatic sorting apparatus. The sorting apparatus eliminates almost all of the stones, as well as a considerable fraction of glass. Depending upon the waste material, approximately 90% of the glass can be recovered later by a second pass through the apparatus, without the reintroduction of an appreciable amount of stones into the cullet.

A central section M, which could not pass through sieve 7a and which comprises pieces of between about 10 and 40 mm in their largest dimension, can represent up to about 80% of the tonnage. The central section contains a lower proportion of impurities that are detrimental to the melt, particularly stones and other infusible products, than that initially contained by the raw material. This section is divided by screening at screen 12 into several portions that are treated in parallel. Preferably, the section is divided into two portions—T2 and T3—respectively having granulometry limits (having geometric proportions in a ratio close to 2:1) of from about 10 to 20 mm and from 20 to 40 mm.

The two portions—one at sorting station 13 and the other at sorting station 14—are each subjected to a visual analysis with manual sorting to remove infusibles and thus improve the output at each station. Lower middle portion T2 represents about 20% of the initial tonnage while upper middle portion T3, which is more heavily charged with impurities, particularly infusible products, represents less than about 60% of the initial tonnage. The work of the operators carrying out the visual checking and handsorting of the infusible fragments is approximately equal for each of the fractions and under these conditions, sorting of stones and infusible fragments from each fraction has a theoretical efficiency of greater than 70%.

Each of the two middle portions is subsequently stored in a delivery-regulating hopper, hoppers 15 and 16 respectively, before undergoing selective grinding in one of two crushers 17 and 18. These are percussion or impact crushers which consist of a bladed rotor which throws the pieces of product to be crushed against a certain number of blades located crosswise on the inside of the crusher tank.

In the crushers, grinding is carried out at a moderate rotational speed, with a suitable air gap—on the order of magnitude of the average dimension of the pieces to be ground. In general, the feed delivery to the crusher will be somewhat less than normal delivery to the crusher used by the manufacturer for routine purposes, for example, the grinding of ores.

The middle portions are then each screened into three respective fractions at two-stage screens 19 and 20.

For the upper middle portion—portion T3—the screening can lead to three fractions whose limits are also in a geometric proportion in a ratio close to 2:1, specifically:

fraction F31, from 0 to 10 mm, which represents about a third of the initial tonnage and is directly usable, fraction F32, from 10 to 25 mm, representing a little more than 20% of the tonnage and whose granulometry and composition are approximately similar to those of the lower of the two middle portions, T2, fraction F33, from 25 to 40 mm, which represents only 1% of the initial tonnage but contains almost 35% of the impurities and, therefore, should be eliminated.

Because of its size characteristics, fraction F32 must be sorted again. It is advantageously mixed with the lower middle portion—T2—and the mixture is then subjected to selective grinding followed by screening into three fractions. Since the tonnage to be treated in this second grinding is, therefore, somewhat smaller in volume than that undergoing the first grinding, it is possible to use two grinders of identical capacity. Advantageously, the limits of the fractions chosen correspond to a geometric progression on the order of about 1.51:

fraction F21, from 0 to 10 mm, represents about 40% of the initial tonnage and is clean enough to be used directly, fraction F22, from 10 to 15 mm, represents only about 4% of the initial tonnage, as was the case for fraction F12, its homogeneity and the small amounts to be treated permits optical sorting at station 21 with an automatic sorting apparatus under the same conditions as at sorting station 11, fraction F23, from 15 to 25 mm, represents about 1% of the initial tonnage and contains up to 15% of the impurities and, therefore, should be eliminated.

At the end of the treatment process, the various recovered fractions are regrouped and sent to a magnetic sorting apparatus 22 which eliminates any metal particles introduced by wear of the grinders.

Throughout the treatment process, the selectivity of the screening and the number of portions to be divided out depend upon the operating conditions and, in particular, the quality of the grinding.

Table I shows, for each of two granulometric portions, T2 (10 to 20 mm) and T3 (20 to 40 mm), three examples of the distribution of granulometries, as a function of the peripheral speeds of the rotors (in m/s on $AP_o$-type grinder of the HAZEMAG company, used for a delivery of 2.5 t/h) and the air gap (in cm). For each of the portions, the operating conditions noted above correspond, respectively, to those of tests 22 and 32.

Division into portions other than those noted above is possible but, with this type of raw products, they represent the optimal compromise of balancing and yield of the mechanical sorting.

The tonnages indicated correspond to a treatment of 25 tons of recovery glass. The tonnages and the glass content were calculated from measurements made on experimental samples in a pilot installation, corresponding to the treatment of two tons of product by using the HAZEMAG-type $AP_o$ crushers mentioned above. Table II summarizes the results of this treatment.

TABLE II

| Glass Recovered In The Fraction Treated By Selective Grinding: 98% | | |
|---|---|---|
| IMPURITIES ELIMINATED | without manual sorting | with manual sorting |
| Infusibles | 70% | 92.5% |
| Non-ferrous | 85% | 85% |
| Lights | 84% | 84% |
| Ferrous | 100% | 100% |

Table II clearly shows that this invention provides a mechanical sorting process characterized by a high degree of efficiency and reliability that could only be obtained in several stages, and by considerable manpower if a manual sorting technique were used. The use of this mechanical sorting process, alone, or in combination with a manual sorting process, permits the intro-

TABLE I

GRINDING CONDITIONS
GRANULOMETRIC DISTRIBUTION IN CUMULATED %
(rounded values)

| PORTION 10-20 FRACTION cumulated % | TEST 21 speed: 17 m/s air gap: 1 cm | | | | TEST 22 speed: 12 m/s air gap: 1 cm | | | | TEST 23 speed 12 m/s air gap: 3 cm | | | |
|---|---|---|---|---|---|---|---|---|---|---|---|---|
|  | glass | stones | nonferrous | lights | glass | stones | nonferrous | lights | glass | stones | nonferrous | lights |
| 15-20 | 0.33 | 0 | 39 | 39 | 1 | 22 | 22 | 59 | 2 | 34 | 24 | 50 |
| 10-15 | 4 | 31 | 72 | 72 | 9 | 59 | 76 | 70 | 10 | 64 | 71 | 80 |
| 8-10 | 11 | 68 | 89 | 89 | 24 | 82 | 92 | 73 | 29 | 83 | 93 | 90 |
| 3-8 | 54 | 100 | 100 | 100 | 72 | 100 | 100 | 99.9 | 74 | 100 | 100 | 100 |
| 0.63-3 | 89 | | | | 94 | | | | 95 | | | |
| 0.63 | 100 | | | | 100 | | | | 100 | | | |

| PORTION 20-40 FRACTION cumulated % | TEST 31 speed: 12 m/s air gap: 1 cm | | | | TEST 32 speed: 8 m/s air gap: 1 cm | | | | TEST 33 speed: 8 m/s air gap: 5 cm | | | |
|---|---|---|---|---|---|---|---|---|---|---|---|---|
|  | glass | stones | nonferrous | lights | glass | stones | nonferrous | lights | glass | stones | nonferrous | lights |
| 30-40 | 0 | 0 | 2 | 40 | 0.15 | 27 | 10 | 31 | 0.2 | 13 | 20 | 44 |
| 25-30 | 0.4 | 15 | 23 | 80 | 1 | 40 | 46 | 80 | 2 | 50 | 46 | 84 |
| 20-25 | 1 | 26 | 49 | 88 | 4 | 57 | 64 | 95 | 7 | 60 | 70 | 94 |
| 15-20 | 5 | 54 | 74 | 96 | 18 | 76 | 99 | 99 | 27 | 79 | 97 | 98 |
| 10-15 | 17 | 72 | 84 | 97 | 40 | 89 | 99.9 | 100 | 48 | 87 | 98 | 99 |
| 8-10 | 36 | 84 | 88 | 99 | 60 | 95 | | | 95 | 99 | | |
| 3-8 | 77 | 98 | 99.9 | 100 | 87 | 100 | | | 90 | 100 | | |
| 0.63-3 | 96 | | | | 97 | | | | 99 | | | |
| 0.63 | 100 | | | | 100 | | | | 100 | | | |

Figure 2:
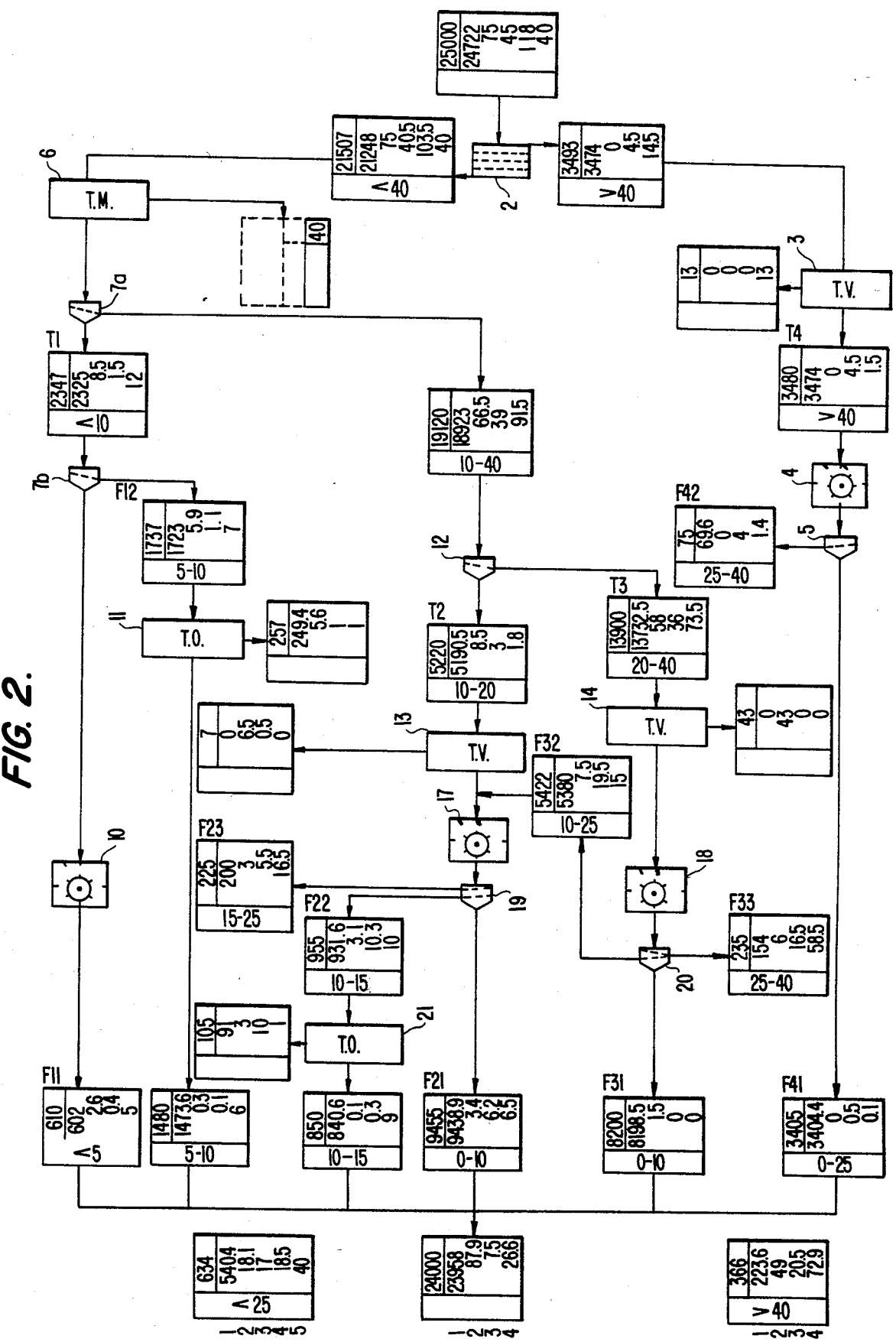
FIG. 2 represents a schematic diagram of the operation of an installation of this invention.

FIG. 2 illustrates how the constituents of the initial cullet are distributed in the example of FIG. 1, between the various fractions that are to be recovered or eliminated. These constituents are sorted, according to the process previously detailed, into five categories:

1—glass
2—infusibles
3—non-ferrous products
4—light products
5—ferrous products.

In the FIG. 2 diagram, the distribution of the total tonnage and its breakdown into categories are indicated in the various boxes, in successive columns, 0 to 5, ranked in a constant order and summarized at the bottom of the table. Ferrous materials, which are eliminated at the beginning of the operation by supplementary magnetic sorting, appear only at the top of the diagram.

duction of amounts of cullet that can exceed 50% of the waste material into the hollow glass melt, depending on the particular state of purity of and the method of collecting the recovered products.

The process of this invention is not limited to the examples given. It is possible, without exceeding the scope of the invention, to add other various steps to the process. For example, after elimination of the fines and the large fragments, the central portion of the material could be divided into more than two portions which could be partially recycled to the lower portions after grinding. In cases where the proportion of cullet to be incorporated into the melt is relatively small, or if the raw starting products have come from carefully-made direct collection processes, the manual sorting steps preceding the selective grindings can be totally eliminated. Alternatively, it would be possible to limit any manual sorting stages to follow the selective grindings.

Other possible embodiments of the invention would complete the magnetic sorting made at sorting station 6, treat the fines by aspiration of the light products or treat the two fractions F12 and F22 on the same automatic optical sorting apparatus, add fraction F42 into portion T3 in hopper 16. On the other hand it has been found that a better separation of fraction F23 is obtained if the upper deck of screen 19 has openings, made of slits disposed transversely to its slope about 10 mm wide and 25 mm long for instance.

I claim:

1. A process for purifying recovery glass from raw waste materials for making cullet comprising:
   (a) separating the raw waste material into individual granulometric portions including at least
      (1) a lower portion,
      (2) a middle portion and
      (3) an upper portion,
   wherein the maximum granulometry of substantially the total amount of raw waste material in said lower portion is no greater than the minimum granulometry of raw waste material in said middle portion, and the maximum granulometry of substantially the total amount of raw waste material in said middle portion is no greater than the minimum granulometry of raw waste material in said upper portion;
   (b) isolating each portion during the steps (c) and (d), and thereafter comingling each recoverable fraction of the raw waste material;
   (c) grinding the raw waste material of at least two of said separated and isolated portions; then
   (d) screening the raw waste material of each separated and isolated portion which shall have been ground thus separating a nonrecoverable fraction from said recoverable fraction.

2. The process of claim 1, wherein said middle portion is first separated into:
   (a) an upper middle portion of raw waste material whose granulometry is within substantially a first range, and
   (b) a lower middle portion of raw waste material whose granulometry is within substantially a second range, lower than that of said first range,
   wherein each said range of separated raw waste material in said separated middle portion is separately ground, and then, each portion is screened and classified into three fractions including
   (c) an upper fraction which is discarded
   (d) a middle fraction, and
   (e) a lower fraction which is directly recovered.

3. The process of claim 2 wherein said middle fraction of said upper middle portion is comingled with material of said lower middle portion prior to said lower middle portion being ground.

4. The process of claim 2 wherein the lower portion is comprised of fines which are divided into two fractions comprising:
   (a) a lower fraction which is ground to less than 2 mm; and
   (b) an upper fraction which is subjected to automatic visual sorting.

5. The process of claim 2 wherein the fractions of said lower middle portion have granulometries of about 15 to 25 mm, 10 to 15 mm and 0 to 10 mm, respectively.

6. The process of claim 2 wherein the fractions of said upper middle portion have granulometries of about 25 to 40 mm, 10 to 25 mm and 0 to 10 mm, respectively.

7. The process of claim 2 wherein the upper portion is comprised of larger fragments are subjected to:
   (a) grinding; and
   (b) screening into a fraction which is recovered and a fraction which is eliminated.

8. The process of claim 2 wherein the granulometry limits of said ranges have a geometric proportion in the ratio of about 2:1.

9. The process of claim 2 wherein a manual sorting step is performed in series with at least one of the selective grinding steps.

* * * * *